United States Patent
Huang et al.

(10) Patent No.: US 12,276,525 B2
(45) Date of Patent: Apr. 15, 2025

(54) MULTIFUNCTIONAL RANGING TELESCOPE FOR GOLF

(71) Applicant: Shenzhen Mileseey Technology Co., Ltd., Shenzhen (CN)

(72) Inventors: Jiefeng Huang, Shenzhen (CN); Jingzhuo Huang, Shenzhen (CN); Huiyuan Jian, Shenzhen (CN); Jianjie Yang, Shenzhen (CN); Zhi Chou, Shenzhen (CN)

(73) Assignee: Shenzhen Mileseey Technology Co., Ltd., Shenzhen (CN)

( * ) Notice: Subject to any disclaimer, the term of this patent is extended or adjusted under 35 U.S.C. 154(b) by 248 days.

(21) Appl. No.: 18/088,885

(22) Filed: Dec. 27, 2022

(65) Prior Publication Data
US 2023/0213335 A1 Jul. 6, 2023

(30) Foreign Application Priority Data
Dec. 31, 2021 (CN) .......................... 202111678100.6

(51) Int. Cl.
*G01C 3/04* (2006.01)
*A63B 57/00* (2015.01)
*G01P 5/08* (2006.01)

(52) U.S. Cl.
CPC ................ *G01C 3/04* (2013.01); *A63B 57/00* (2013.01); *G01P 5/08* (2013.01); *A63B 2220/20* (2013.01);
(Continued)

(58) Field of Classification Search
CPC ....... G01C 3/04; A63B 57/00; A63B 2220/20; A63B 2220/76; A63B 2225/685;
(Continued)

(56) References Cited

U.S. PATENT DOCUMENTS

| 2015/0034722 | A1* | 2/2015 | Roman | .................... F41G 1/467 |
| | | | | 235/404 |
| 2019/0094343 | A1* | 3/2019 | Nyhart | ...................... G01S 7/51 |
| 2020/0200530 | A1* | 6/2020 | Nyhart | .................... G01S 17/86 |

FOREIGN PATENT DOCUMENTS

| CN | 2665736 Y | 12/2004 |
| CN | 104635236 A | 5/2015 |

(Continued)

OTHER PUBLICATIONS

Chinese Office Action, Office Action issued in corresponding Application No. 202111678100.6, dated Nov. 11, 2024, 7 pp.

*Primary Examiner* — Tarifur R Chowdhury
*Assistant Examiner* — Akbar H. Rizvi
(74) *Attorney, Agent, or Firm* — Taft Stettinius & Hollister LLP (57) ABSTRACT

A multifunctional ranging telescope includes a main body, a wind direction and wind speed sensing device, a display device and a power source. The wind direction and wind speed sensing device is movably connected to the main body and includes a sensing element. When the wind direction and wind speed sensing device moves to a sensing position, the sensing element is located outside the main body. The display device is located on a surface of the main body and electrically connected to the wind direction and wind speed sensing device to display a wind direction and wind speed information. The power source is configured to supply power to the wind direction and wind speed sensing device and the display device.

13 Claims, 9 Drawing Sheets

(52) U.S. Cl.
CPC ..... *A63B 2220/76* (2013.01); *A63B 2225/685* (2013.01); *A63B 2230/04* (2013.01); *A63B 2230/08* (2013.01)

(58) Field of Classification Search
CPC ............ A63B 2230/04; A63B 2230/08; A63B 2220/12; A63B 2220/75; A63B 2225/50; G01P 5/08; G01P 13/02; G01P 5/00; G01S 17/08; A61B 5/02055; A61B 5/021; A61B 5/024; A61B 5/14517; G01D 21/02; G02B 23/12
See application file for complete search history.

(56) References Cited

FOREIGN PATENT DOCUMENTS

| | | |
|---|---|---|
| CN | 206876694 U | 1/2018 |
| CN | 304596907 S | 4/2018 |
| CN | 112414217 A | 2/2021 |
| CN | 216718696 U | 6/2022 |
| JP | H06213911 A | 8/1994 |

* cited by examiner

MULTIFUNCTIONAL RANGING TELESCOPE FOR GOLF

CROSS-REFERENCE TO RELATED APPLICATIONS

This application claims priority of Chinese Patent Application No. 2021116781006, filed on Dec. 31, 2021, entitled "MULTIFUNCTIONAL RANGING TELESCOPE FOR GOLF", the entire content of the disclosure is incorporated herein by reference in its entirety

TECHNICAL FIELD

The present disclosure relates to golf auxiliary apparatus, in particular to a multifunctional ranging telescope for a golf.

BACKGROUND

In golf, six or eighteen holes are provided on a golf course, and a curved grass fairway is provided to connect a starting teeing area to a finishing hole in sequence. In order to enhance a beauty of a scenery, challenge and interest, obstacles such as sand traps, plants, pools, mounds, etc. are located on and beside the fairway.

In recent years, high-precision laser ranging telescopes have been used on the golf course to measure a distance from a hitting point to an adjacent obstacle, a far obstacle, an ideal middle landing point, etc. with centimeter-level accuracy, allowing a golfer to hit a ball according to the distance, so as to improve an accuracy of hitting the ball to the hole.

However, currently, even when using a ranging telescope to hit the ball based on the measurement result, the ball still does not land ideally due to some environmental factors.

SUMMARY

Accordingly, a multifunctional ranging telescope for a golf is provided to solve a problem that a golf ball does not land well when a ranging telescope is used to assist golf shots.

A multifunctional ranging telescope for a golf includes a main body, a wind direction and wind speed sensing device movably connected to the main body and including a sensing element, a display device located on a surface of the main body, and a power source configured to supply power to the wind direction and wind speed sensing device and the display device. When the wind direction and wind speed sensing device moves to a sensing position, the sensing element is located outside the main body, the display device is electrically connected to the wind direction and wind speed sensing device and is configured to display a wind direction and wind speed information.

In one of the embodiments, the sensing element comprises a plurality of sensors spaced apart in space.

In one of the embodiments, the sensing element comprises a plurality of sensors, and at least two of the sensors are connected to each other in space.

In one of the embodiments, the sensing element comprises a plurality of sensors, and the plurality of sensors are electrically independent from each other.

In one of the embodiments, the sensing element comprises a plurality of sensors, and at least two of the sensors are electrically connected.

In one of the embodiments, the wind direction and wind speed sensing device comprises a movable rod, the sensing element is located at one end of the movable rod, and the other end of the movable rod away from the sensing element is movably connected to the main body.

In one of the embodiments, the movable rod comprises a plurality of rod bodies telescoped with each other to adjust a length of the movable rod.

In one of the embodiments, the main body is provided with an accommodating groove, the other end of the movable rod is rotatably connected to a sidewall or a bottom of the accommodating groove, and when the wind direction and wind speed sensing device is in an initial position, the wind direction and wind speed sensing device is located in the accommodating groove.

In one of the embodiments, the multifunctional ranging telescope further includes a switch configured to turn on or off the wind direction and wind speed sensing device, and when the wind direction and wind speed sensing device covers or abuts the switch, the switch turns off the wind direction and wind speed sensing device.

In one of the embodiments, the power source comprises a solar panel and a battery, the solar panel is located on the surface of the main body, the battery is located inside the main body, and the solar panel is configured to provide electrical power to the battery.

In one of the embodiments, the multifunctional ranging telescope further includes a magnetic force generating element connected to a sidewall of the main body and configured to be connected to a ferromagnetic portion.

In one of the embodiments, the multifunctional ranging telescope further includes a health sensor provided on the main body, and the health sensor is configured to perform at least one of counting heartbeat, measuring blood pressure, analyzing sweat, measuring body temperature, and detecting an intensity of ultraviolet rays.

In one of the embodiments, the multifunctional ranging telescope further includes a flexible sleeve covering a part of the main body, the flexible sleeve is provided with an exposing hole, and the display device and the sensing element are exposed though the exposing hole.

The multifunctional ranging telescope for a golf can detect a distance through the main body, supply power to the wind direction and wind speed sensing device and the display device though the power source, and detect a wind direction and a wind speed of a golf player's observation point and transmit the data to the display device through the wind direction and wind speed sensing device, so that a player can obtain a current wind direction and wind speed, so as to more accurately estimate a hitting point of a ball.

When hitting the ball, the wind direction and wind speed are detected by the wind direction and wind speed sensing device. Since the player hitting the ball and the observation point are basically the same point, an instantaneous wind direction and wind force of the two are the same. Therefore, when hitting the golf ball, the player can use the wind direction and wind speed sensing device to determine an influence of the wind direction and wind speed on a landing point of the golf ball, so that the landing point of the golf ball is ideal.

These and other objects, advantages, purposes and features will become apparent upon review of the following specification in conjunction with the drawings.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The present disclosure will now be described in detail with reference to the accompanying drawings and embodiments in order to make the objects, technical solutions, and advantages of the present disclosure clearer. It should be understood that the specific embodiments described herein are only for explaining the present disclosure, and not intended to limit the present disclosure.

In the description of the present disclosure, it should be understood that the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential" and other indicated orientations or positional relationships are based on the orientations or positional relationships shown in the accompanying drawings, and are only for the convenience of describing the present disclosure and simplifying the description, rather than indicating or implying the indicated device or elements must have a particular orientation, be constructed and operate in a particular orientation, so it should not be understood as a limitation of the invention.

In addition, the terms "first" and "second" are only used for descriptive purposes, and should not be construed as indicating or implying relative importance or implying the number of indicated technical features. Thus, a feature delimited with "first", "second" may expressly or implicitly include at least one feature. In the description of the present disclosure, "plurality" means at least two, such as two, three, etc., unless otherwise expressly and specifically defined.

In the present disclosure, unless otherwise expressly specified and limited, the terms "mounted", "connection", "connected", "fixed" and other terms should be understood in a broad sense. For example, it may be a fixed connection or a detachable connection, or integrated. It can be a mechanical connection or an electrical connection. It can be directly connected or indirectly connected through an intermediate medium. It can be the internal connection of two elements or the interaction relationship between the two elements, unless otherwise specified and limited. For those of ordinary skill in the art, the specific meanings of the above terms in the present disclosure can be understood according to specific situations.

In the present disclosure, unless otherwise expressly specified and limited, the first feature "above" or "below" the second feature may be in direct contact with the first and second features, or the first and second features may be in indirect contact through an intermediate medium. Moreover, the first feature being "above" and "over" the second feature may mean that the first feature is directly above or diagonally above the second feature, or it only means that the horizontal height of the first feature is higher than the second feature. The first feature being "below" of the second feature may mean that the first feature is directly below or obliquely below the second feature, or simply means that the horizontal height of the first feature is less than that of the second feature.

It should be noted that when an element is referred to as being "fixed to" or "disposed on" another element, it can be directly on the other element or an intervening element may also be present. When an element is referred to as being "connected" to another element, it can be directly connected to the other element or intervening elements may also be present. The terms "vertical", "horizontal", "upper", "lower", "left", "right" and similar expressions used herein are for the purpose of illustration only and do not represent the only embodiment.

In prior art, players can obtain wind speed and wind direction information provided by a stadium management through a wireless device. However, the current technical solution has following disadvantages. Since a position where the stadium management measures the wind speed and wind direction is different from an actual position of players scattered around the stadium, an error between the wind speed and wind direction information provided by the stadium management and the wind speed and wind direction at the player's position is large. In addition, in the prior art, it is also necessary to provide the wireless device to wirelessly connect with an external device.

Referring to FIGS. 1 to 9, an embodiment of the present disclosure provides a multifunctional ranging telescope 001 for golf that can measure wind speed and wind direction in real time without depending on an external equipment. The multifunctional ranging telescope 001 includes a main body 100, a wind direction and wind speed sensing device 200, a display device 300, and a power source 400. The main body 100 is configured to perform telephoto and distance measurement. The wind direction and wind speed sensing device 200 is configured to detect a wind direction and a wind speed, and transmit detected wind direction and wind speed information to the display device 300. The display device 300 is configured to display the wind direction and the wind speed information, so that the player can obtain the wind direction and the wind speed information, which is convenient for the golf player to take a shot. The power source 400 is configured to supply power to the wind direction and wind speed sensing device 200 and the display device 300 to enable the two to work.

The wind direction and wind speed sensing device 200 can detect the wind direction and wind speed when hitting the golf ball, and since the position of the player hitting the ball and the detection position are basically the same point, an instantaneous wind direction and wind force at the two positions are the same. Therefore, before hitting the golf ball, the player can use the wind direction and wind speed sensing device 200 to determine an influence of the wind direction and wind speed on a landing point of the golf ball, so that the landing point of the golf ball is ideal.

Figure 1:
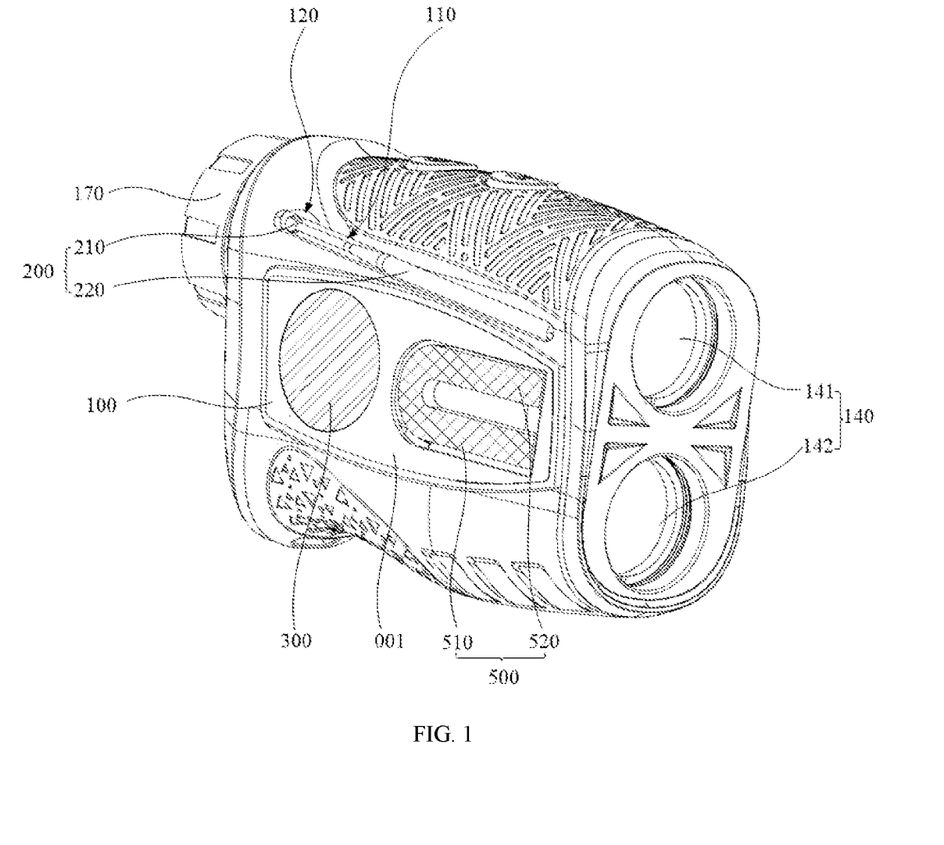
FIG. 1 is a perspective view of a multifunctional ranging telescope for a golf according to an embodiment of the present disclosure.
Figure 2:
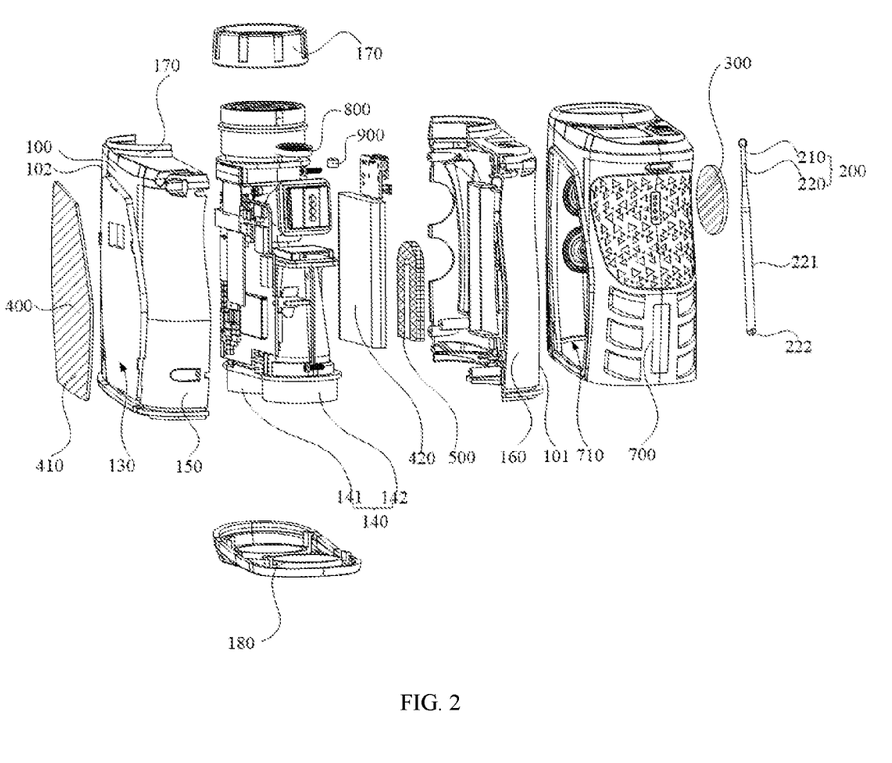
FIG. 2 is an exploded view of FIG. 1.

In some embodiments, as shown in FIGS. 1 and 2, the main body 100 includes a core assembly 140, a top shell 150, and a bottom shell 160. The core assembly 140 includes a telescope lens 141 and a rangefinder lens 142. The main body 100 performs telephoto and distance measurement through the core assembly 140. The top shell 150 is detachably connected to the bottom shell 160 to facilitate an installation of the core assembly 140 and other components. The telescope lens 141 includes an eyepiece end and an objective lens end. The main body 100 may further include a focusing tube protecting sleeve 170 detachably sleeve on the eyepiece end, and a front cover 180 detachably sleeve on the objective lens end to protect the objective. Outer surfaces of the top shell 150 and the bottom shell 160 form an outer wall of the main body 100.

Figure 3:
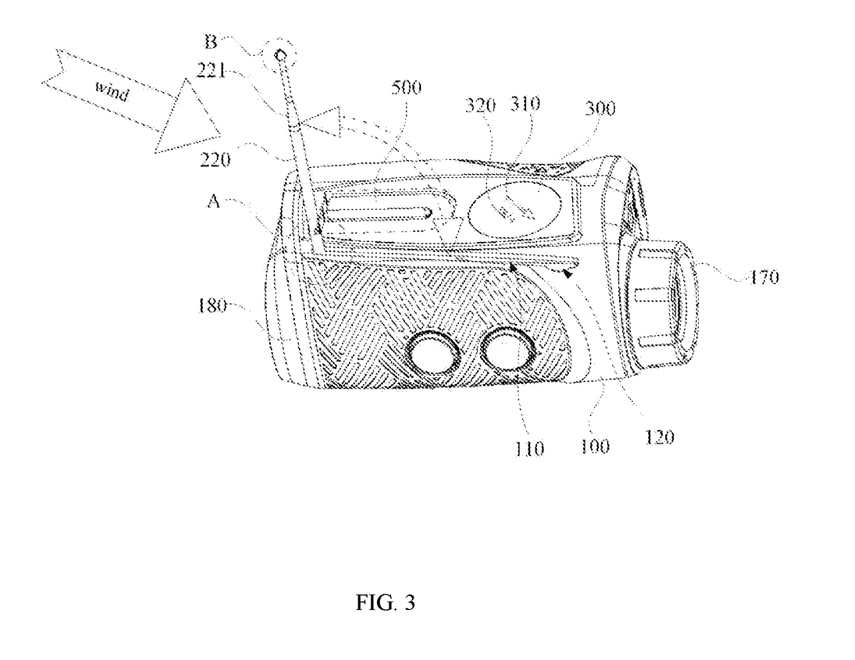
FIG. 3 is a perspective view of a wind direction and wind speed sensing device in FIG. 1 at a sensing position.

In some embodiments, as shown in FIGS. 1 to 3, the wind direction and wind speed sensing device 200 is movably connected to the main body 100, in other words, the wind direction and wind speed sensing device 200 can move relative to the main body 100. The wind direction and wind speed sensing device 200 includes a sensing element 210. The wind direction and wind speed sensing device 200 can be switched from an initial position to a sensing position. When the wind direction and wind speed sensing device 200 moves to a sensing position relative to the main body 100, the sensing element 210 is located outside the main body 100. The sensing element 210 can detect the wind direction and wind speed according to the environment where the sensing element 210 is located. When the wind direction and wind speed sensing device 200 is switched to the initial position, the sensing element 210 is located inside the main body 100 and does not protrude from a surface of the main body 100, so as to protect the wind direction and wind speed sensing device 200 when it is not in use.

Figure 4:
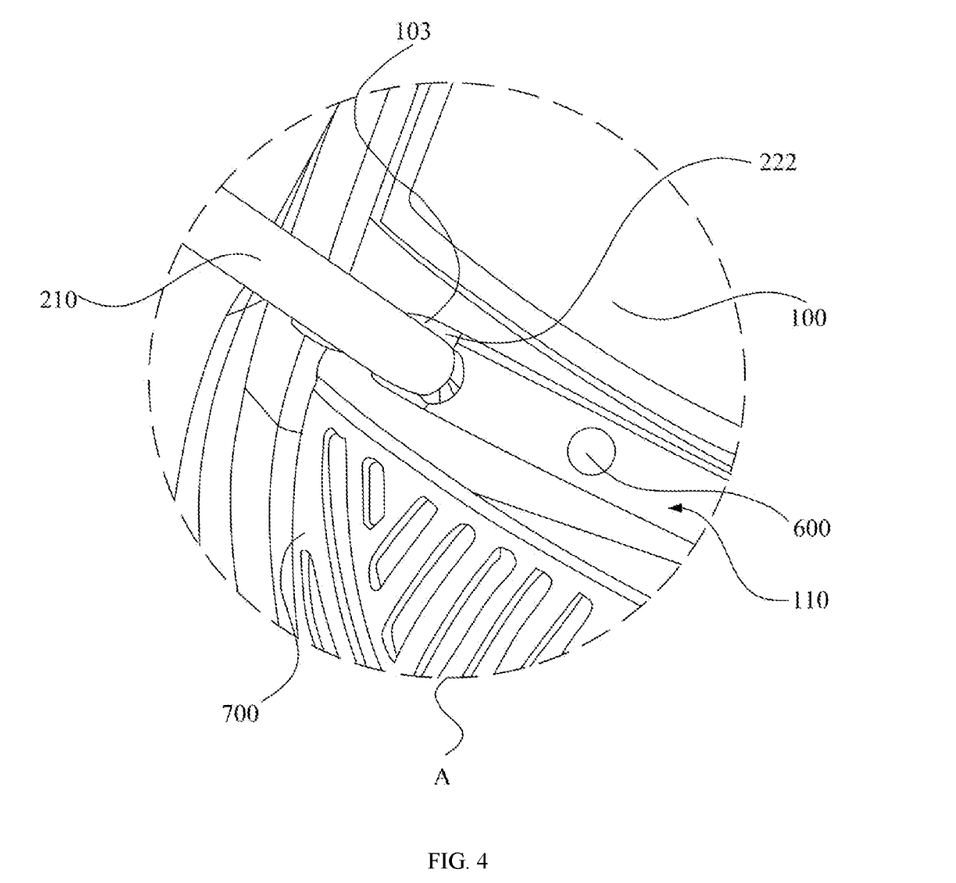
FIG. 4 is a partial enlarged view of portion A in FIG. 3.

In some embodiments, as shown in FIGS. 1 to 3 and 9, the wind direction and wind speed sensing device 200 includes a movable rod 220 and the sensing element 210. One end of the movable rod 220 is movably connected to the main body 100 through, for example, a rotating shaft 222 or a hinge, and the other end of the movable rod 220 is connected to the sensing element 210. By moving the movable rod 220 relative to the main body 100, the sensing element 210 is driven to move relative to the main body 100, so that the sensing element 210 can be switched to the sensing position or the initial position. As shown in FIG. 3 and FIG. 4, in the embodiment, the main body 100 is provided with an accommodating groove 110 corresponding to the movable rod 220. The end of the movable rod 220 is rotatably connected to a sidewall or a bottom of the accommodating groove 110. The accommodating groove 110 is configured to accommodate the movable rod 220 and the sensing portion 210. The accommodating groove 110 can provide protection for the wind direction and wind speed sensing device 200 when it is not in use, thereby reducing damage to the wind direction and wind speed sensing device 200 caused by bumping.

Figure 9:
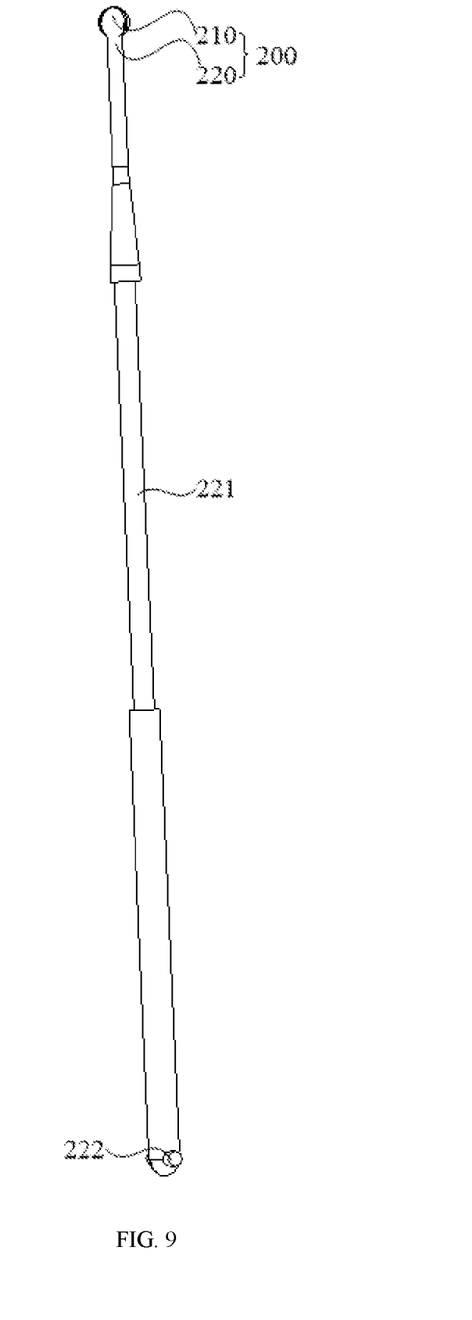
FIG. 9 is a perspective view of a movable rod showing in FIG. 3 in an extended state.

In one embodiment, as shown in FIG. 4 and FIG. 9, the rotating shaft 222 extends through the end of the movable rod 220. Both ends of the rotating shaft 222 extends into two opposite groove walls of the accommodating groove 110, respectively, so that the movable rod 220 is rotatably connected to the sidewall of the accommodating groove 110. In another embodiment, the sidewall of the movable rod 220 may be provided with protrusions, which may be semicircular or similar to semicircular. Two opposite sidewalls of the accommodating groove 110 are provided with grooves corresponding to the protrusions, and the movable rod 220 can be rotated relative to the accommodating groove 110 along the protrusions.

In some embodiments, as shown in FIG. 1 and FIG. 3, a widening groove 120 may be provided at a side of an end of the accommodating groove 110 away from the movable rod 220. The widening groove 120 is in communication with the accommodating groove 110, and the player can grab the movable rod 220 or the sensing element 210 through the widening groove 120, so as to move the movable rod 220 to the sensing position.

In the embodiment, when the movable rod 220 is in the sensing position as shown in FIG. 3, an angle between the movable rod 220 and a plane where the bottom of the accommodating groove 110 is located may be 75° to 135°. Specifically, it can be 75°, 90°, 105°, 120° or 135°. In some embodiments, the angle is 90°. When the angle is 90°, a test result is more accurate when detecting the wind direction and wind speed.

When the movable rod 220 is at the initial position (as shown in FIG. 1), the surface of the movable rod 220 and the sensing portion 210 away from the bottom of the accommodating groove 110 may not protrude from an opening of the accommodating groove 110. A gap is provided between a surface of the sensing portion 210 adjacent to the bottom of the accommodating groove 110 and the bottom of the accommodating groove 110. The above configuration can protect the sensing portion 210 and prolong its service life.

When the movable rod 220 is in the sensing position (as shown in FIG. 3), the sidewall of the accommodating groove 110 closest to the movable rod 220 abuts against the sidewall of the movable rod 220 to limit the movable rod 220 and prevent it from rotating excessively. Specifically, in the embodiment shown in FIG. 4, the two opposite sidewalls of the accommodating groove 110 are rotatably connected to the movable rod 220, and a limiting sidewall 103 is sandwiched between the aforementioned two sidewalls. When the movable rod 220 is in the sensing position, the sidewall of the movable rod 220 abuts against the limiting sidewall 103.

In some embodiments, the limiting sidewall 103 may also be provided with a limiting protrusion (not shown), and the limiting protrusion is provided with a limiting groove for accommodating the movable rod 220. A sidewall of the limiting groove may be in clearance fit with the movable rod 220, so that the movable rod 220 can be retained at the sensing position stably.

In some embodiments, as shown in FIG. 4, a switch 600 may be provided on the sidewall or the bottom of the accommodating groove 110. The switch 600 is configured to turn on or off a power supply to the wind direction and wind speed sensing device 200. When the wind direction and wind speed sensing device 200 shields or abuts the switch 600, the switch 600 turns off the power supply to the wind direction and wind speed sensing device 200. Through above configuration, when the wind direction and wind speed sensing device 200 is in the sensing position, it will not shield or abut the switch 600, so that the switch 600 turns on the power supply to the wind direction and wind speed sensing device 200, and the wind direction and wind speed sensing device 200 starts to work. After use, the wind direction and wind speed sensing device 200 can be rotated to the initial position to shield or abut the switch 600, so that the switch 600 turns off the power supply to the wind direction and wind speed sensing device 200.

In some embodiments, the switch 600 may be located at the bottom of the accommodating groove 110. The switch 600 can be an inductive switch or a push switch. When the switch 600 is an inductive switch, the movable rod 220 can shield the switch 600 to turn off the switch 600. When the switch 600 is a push switch, the movable rod 220 can abut the switch 600 to turn off the switch 600. It should be understood that, in some other embodiments, the switch 600 may also be located on other sidewalls of the main body 100. In these embodiments, the wind direction and wind speed sensing device 200 is turned on and off by manually pressing or toggling the switch 600.

In some embodiments, the switch 600 may also be located inside the main body 100. In these embodiments, the switch 600 is turned on and off by means of Bluetooth or wireless control, etc., to turn on and off the wind direction and wind speed sensing device 200.

In addition, the movable rod 220 may be a single-section rod or a multi-section rod. The movable rod 220 may be an integrally formed rod or a telescopic rod. In some embodiments, as shown in FIGS. 3 and 9, the movable rod 220 is the telescopic rod. Specifically, the movable rod 220 has two or more rod bodies 221 that can be relatively telescoped. The rod bodies 221 are telescoped with each other, so that the length of the movable rod 220 can be adjusted. That is, the movable rod 220 is a multi-section telescopic rod. Using the telescopic rod can make the sensing element 210 farther away from the main body 100, so as to avoid a disturbance of the airflow caused by the main body 100, thereby improving a wind measurement accuracy. The telescopic movable rod 220 can shrink for storage when not in use, thus reducing an exposed volume of the movable rod 220 and a probability of collision damage.

As shown in FIG. 9, the movable rod 220 includes three adjacent rod bodies 221 sleeved in sequence. A diameter of the rod body 221 in the middle is less than that of the rod bodies 221 at both ends. When the length of the movable rod 220 is the shortest, the rod body 221 at the middle is located in the rod body 221 at the end, and the sidewalls of the rod bodies 221 at both ends of the movable rod 220 are in contact with each other. In this way, an outer shape of the movable rod 220 relatively uniform when the length is the shortest, and can also protect the rod body 221 located in the middle. The shape of the sensing portion 210 can be selected according to an actual situation, for example, a cylindrical shape, a spherical shape, a conical shape or a spindle shape can be selected.

Figure 5:
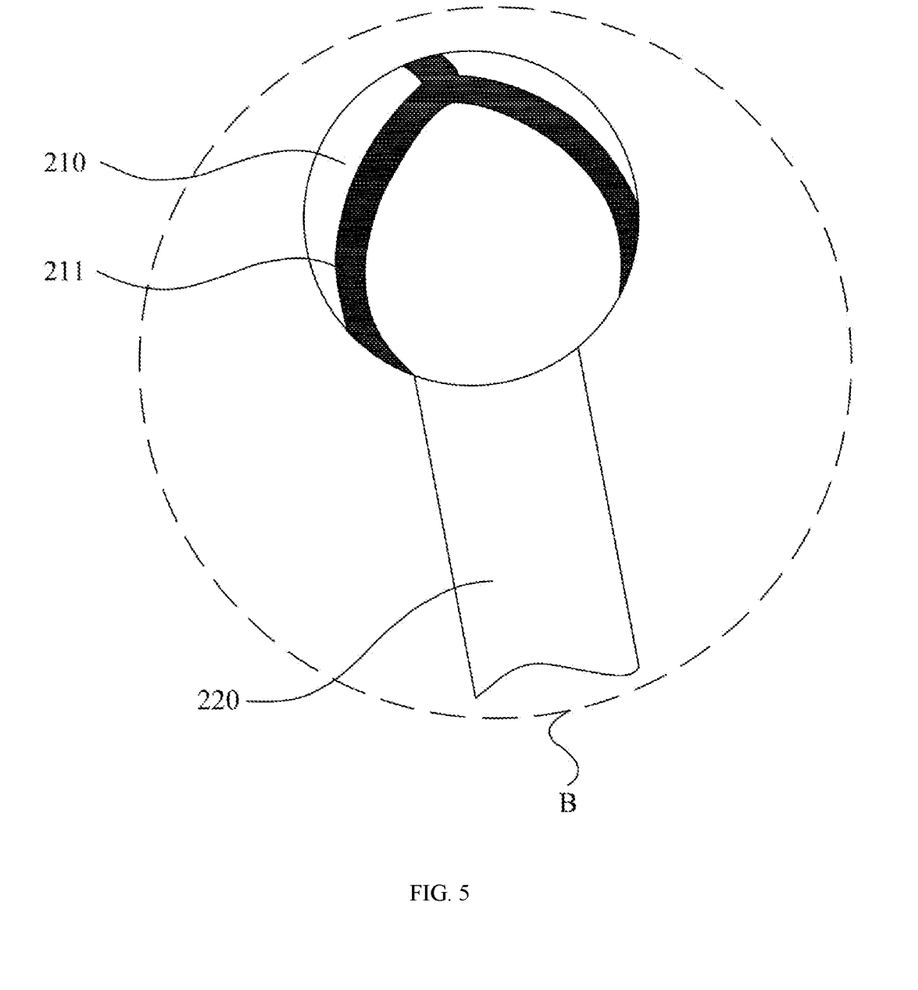
FIG. 5 is a partial enlarged view of portion B in FIG. 3.

In some embodiments, as shown in FIG. 5, the sensing portion 210 connected to the end of the movable rod 220 includes at least one sensor 211, such as one, two, three or four and so on. The plurality of sensors 211 are arranged at intervals. When the wind direction and wind speed sensing device 200 is in the sensing position, each sensor 211 can be oriented in different directions, so as to detect the wind speed and wind direction more accurately.

It should be noted that, no matter the number of sensors 221 is one, two, three, four, or more than four, the sensing portion 210 can measure the wind direction and wind speed. In the illustrated embodiment, three sensors 221 are provided, a better balance is achieved between a complexity and cost of a processing circuit and a fitting algorithm, and the measurement accuracy.

In some embodiments, when two or more the sensors 211 are provided, all the sensors 211 are spaced apart in space. The "spaced apart in space" used herein means the mechanical structures of the sensors 211 are spatially spaced apart. That is, the mechanical structures of all the sensors 211 are not spatially connected.

In other embodiments, when two or more sensors 211 are provided, at least two sensors 211 are spatially connected to each other. That is, the mechanical structures of some of the sensors 221 are spatially connected, and the mechanical structures of the remaining sensors are spatially disconnected. In other embodiments, the mechanical structures of some sensors are spatially connected to form a group, there may be multiple groups. There is no connection relationship between the multiple groups of sensors, and the number of sensors in each group may be different. In other embodiments, the mechanical structures of all sensors are spatially connected. The mechanical structures of the sensors can be connected in space by welding or integral molding, or other connection methods.

In the illustrated embodiment, the mechanical structures of all sensors 211 are spatially connected. All of the sensors 211 are connected at one end thereof, and a junction can be located at the end of the sensing portion 210 away from the movable rod 220. The other ends of all the sensors 211 are spaced apart. In some of these embodiments, the distances between the other ends of all the sensors 211 may be equidistant or non-equidistant. In other embodiments, among the two connected sensors 211, one sensor 221 can be connected to the other sensor 221 through any portion thereof.

In some embodiments, the sensing portion 210 includes one sensor 211, an end of the sensor 211 can be electrically connected to the power source 400, so that the power source 400 can supply power to the sensor 211, and the other end of the sensor 211 is connected to a signal processing circuit. Alternatively, both ends of the sensor 211 are electrically connected a signal processing circuit.

In other embodiments, the sensing portion 210 includes at least two sensors 211, the sensors 211 are electrically independent of each other. That is, the sensors 211 are respectively electrically connected to the battery 420 and/or the signal processing circuit, there is no electrical interconnection between the sensors 211.

In some other embodiments, the sensing portion 210 includes at least two sensors 211, the at least two sensors 211 are electrically interconnected. That is, in some embodiments, some of the sensors 221 are electrically interconnected and the remaining sensors 211 are electrically independent. In other embodiments, some of the sensors 221 are electrically interconnected to form a circuit. Multiple circuits may be provided, the multiple circuits are electrically independent, a number of sensors 221 in each circuit may be different. In other embodiments, all sensors 221 are electrically interconnected. The sensors 211 may be connected by conductors, such as wires.

It should be noted here that when powered, the electrically interconnected sensors 211 may be powered by one power source 400. Electrically independent sensors 211 may be powered by separate power sources 400. Electrically independent sensors 211 are powered using different power sources 400 from other electrically interconnected sensors 211. In the illustrated embodiment, the sensing portion 210 is a sphere with a smooth surface. Three sensors 211 may be provided, and the sensors 211 are arranged in a Y-shape. The mechanical structures of all sensors 211 are spatially connected. The three sensors 211 are evenly arranged at equal distances. All sensors 221 are electrically interconnected.

In some embodiments, the sensor 211 may be a conductive heating film. The conductive heating film may be connected to the power source 400 through a wire. The wire extends through the movable rod 220 to connect to the power source 400. It should be noted that the power source connected to the sensor 211 may be a power source dedicated to the sensor, or may be the power source 400. When the current flows, the sensor 211 is energized to generate heat, so that a temperature of the sensor 211 is higher than an ambient temperature. When the wind blows, the wind will take away part of the heat from the surface of the sensor 211. Since the amount of heat taken away by the wind has a certain relationship with the wind speed, the wind speed information can be obtained according to a heat dissipation speed (that is, an electric heating power) and this relationship. Since the orientations of different sensors 211 are different, the blowing angles of the wind blowing the sensors 211 are different, resulting in different heat taken away by the wind on the surfaces of different sensors 211. Therefore, an incoming wind angle can be obtained according to the difference in heat dissipation (that is, the difference in electric heating power) of each sensor 211, that is, the wind direction information can be obtained. A relationship between the heat dissipation speed of the sensor 211 and the wind speed, and a relationship between the difference in heat dissipation and the wind direction can be calibrated by a manufacturer and input into a built-in memory before leaving the factory. In addition, in other embodiments, the sensor 211 may be other sensors, for example, a fan, a wind cup method wind sensor, or an ultrasonic wind sensor, etc.

In some embodiments, as shown in FIG. 3, the display device 300 may display the wind direction and the wind speed information. The wind speed is visualized through the display device 300, which is convenient for the player to make accurate judgments. During display, the display device 300 may include a wind direction and wind force display area 310 and a wind speed display area 320.

The wind direction and wind force display area 310 is configured to display a bar-shaped asymmetric image, for example, an arrow may be displayed. An end of the image is pointing in the same direction as the wind (i.e., a direction of the arrow). A length (L) of the image can be proportional to ae value of the wind speed (v). That is, L=a*v. A display scale coefficient a is a certain value between 0 to 1, which can be manually selected by a selection switch. Intuitively, the higher the wind speed, the longer the length of the arrow. The lower the wind speed, the shorter the length of the arrow. The direction of the arrow will change in real time to be consistent with the current wind direction.

The wind speed display area 320 is configured to display the specific value of the wind speed. A unit of the wind speed can be changed, for example, it can be m/s or km/h, etc., and other units such as feet/s, yards/s or miles/hour can be selected through a switching button to meet the customary system of different countries. The switching button may be located on the surface of the main body 100. The unit displayed on the display device 300 can be changed by pressing the switching button, and the unit displayed on the display device 300 can be cyclically changed by repeatedly pressing the switching button.

In some embodiments, the display device 300 and the wind direction and wind speed sensing device 200 are located on the same sidewall of the main body 100. In this way, it is convenient for the player to observe a detection result of the wind direction and the wind speed in real time while using the device 200 to detect the wind.

Figure 6:
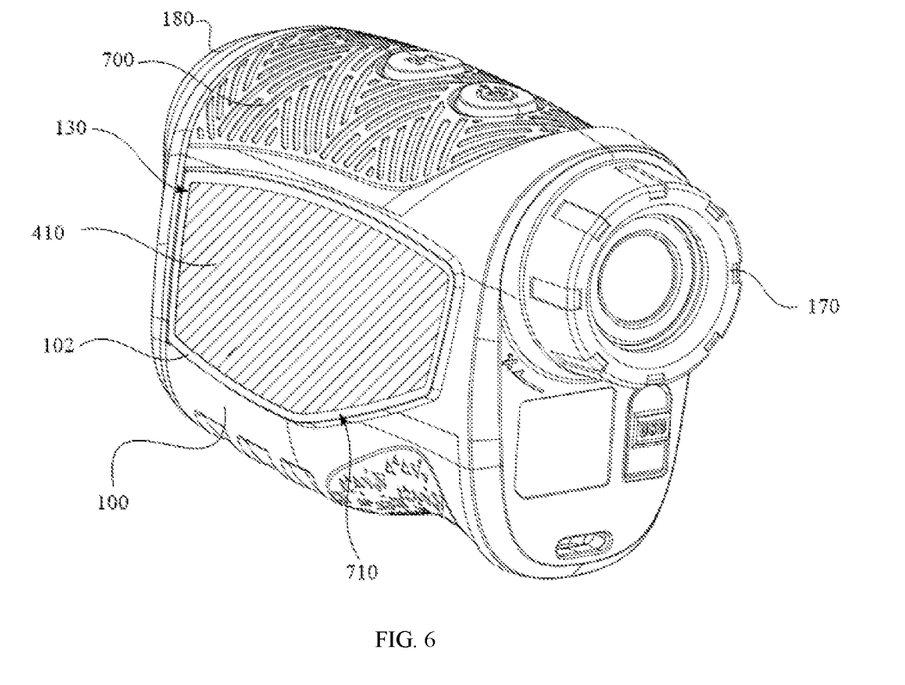
FIG. 6 is a perspective view of FIG. 1 viewed from another aspect.

In some embodiments, as shown in FIGS. 2 and 6, the power source 400 includes a solar panel 410 and a battery 420. The battery 420 may be a rechargeable battery. The solar panel 410 is located on a surface of the main body 100, the battery 420 may be located inside the main body 100. The solar panel 410 is configured to provide power to the battery 420. That is, the solar panel 410 can charge the battery 420. A combination of the solar panel 410 and the battery 420 enables the battery 420 to be charged at any time, so as to maintain a normal use of the multifunctional ranging telescope 001, thereby eliminating the player's power worries and allowing them to concentrate on playing.

In some embodiments, the solar panel 410 may be located on at least part of the surface of the main body 100. Specifically, in some embodiments, the solar panels 410 are disposed on multiple surfaces of the main body 100 to facilitate charging the battery 420. In some embodiments, the solar panel 410 is located on only one surface of the main body 100. In other embodiments, the solar panel 410 may occupy all of one surface of the main body 100. In other embodiments, the solar panel 410 may occupy a part of the surface of the body 100.

A shape of the solar panel 410 can be configured according to an actual situation. In some embodiments, the shape of the solar panel 410 may be substantially consistent with a shape of the surface of the main body 100 where the solar panel 410 is located.

In some embodiments, the solar panel 410 and the surface of the main body 100 can be connected by a snap-fit connection. For example, a mounting groove 130 is provided on the surface of the main body 100, and the solar panel 410 is engaged in the mounting groove 130. In some other embodiments, the solar panel 410 and the main body 100 may be connected by means of gluing or other means. A connection mode between the solar panel 410 and the main body 100 can be selected according to the actual situation.

In some embodiments, the solar panel 410 may occupy 15% to 35% of a surface area of the main body 100, above proportion may enable the solar panel 410 to better receive solar energy, and can make remaining portions on the surface of the main body 100 moderate.

In some embodiments, as shown in FIGS. 1 to 3, at least one sidewall of the main body 100 is provided with a magnetic force generating element 500. The magnetic force generating element 500 is configured to connect the main body 100 to a ferromagnetic portion, thereby making the multifunctional ranging telescope 001 more portable.

Figure 7:
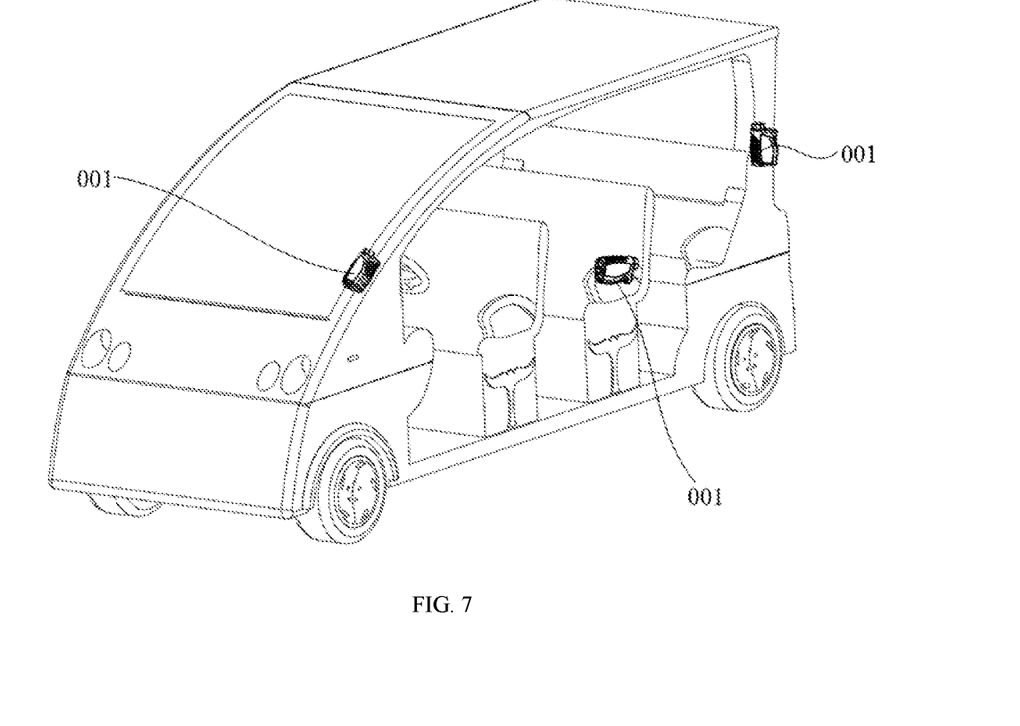
FIG. 7 is a schematic view showing an application scenario of the multifunctional ranging telescope according to an embodiment of the present disclosure.

For example, in some embodiments, as shown in FIG. 7, the multifunctional ranging telescope 001 can be attached on the surface of a golf cart, an inner iron handrail of the golf cart, etc., in other words, it can be attached on any ferromagnetic portion of the golf cart.

Figure 8:
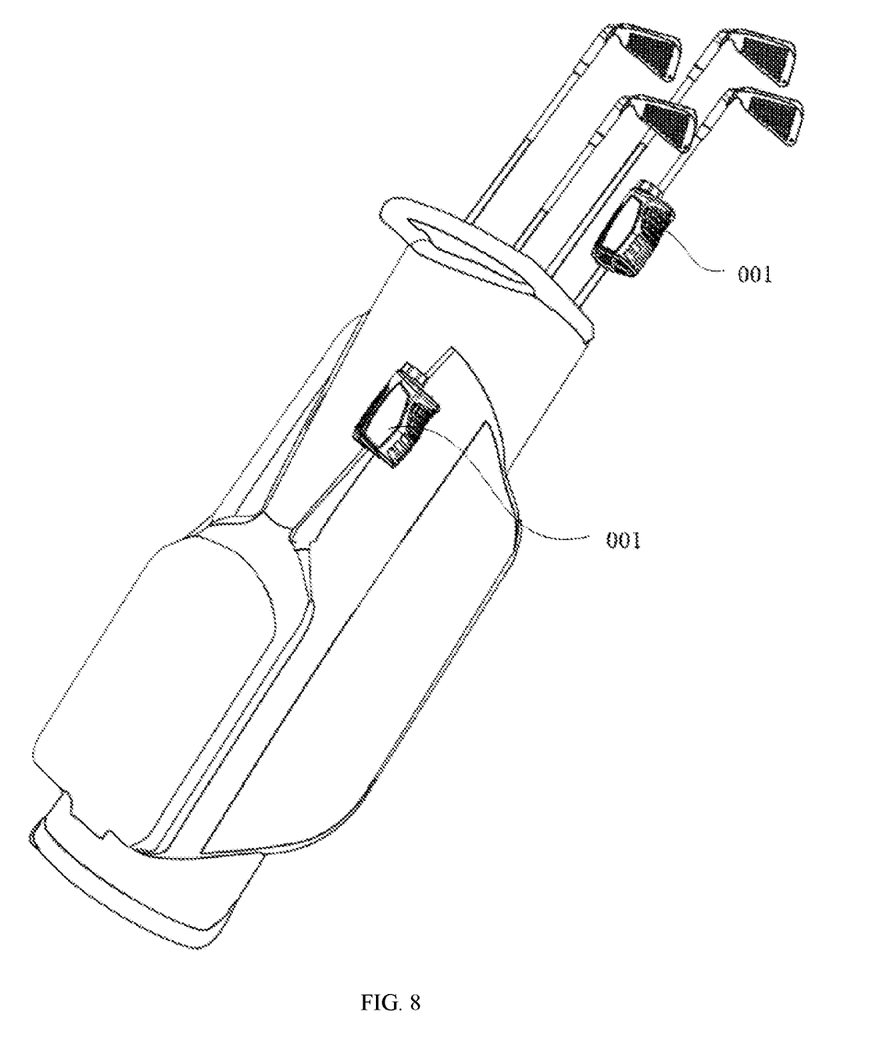
FIG. 8 is a schematic view showing another application scenario of the multifunctional ranging telescope according to an embodiment of the present disclosure.

For another example, in other embodiments, as shown in FIG. 8, the multifunctional ranging telescope 001 can be attached to an iron object such as a golf bag or a golf club.

In the above scenarios, when using the multifunctional ranging telescope 001, it can be taken from the golf cart, bag or club in time, there is no need to take out or put the multifunctional ranging telescope 001 in the carry bag many times during the game.

In some embodiments, the magnetic force generating element 500 may be a permanent magnet, an electromagnet or a combination of the two. The above elements can generate a magnetic field so as to connect the multifunctional ranging telescope 001 with ferromagnetic objects.

In some embodiments, as shown in FIG. 1 and FIG. 2, the magnetic force generating element 500 may be U-shaped. The U-shaped magnetic force generating element 500 may be provided on the surface of the main body 100. The U-shaped magnetic force generating element 500 may include a first magnetic force generating section 510 and a second magnetic force generating section 520 that are connected to each other. In some embodiments, free ends of the first magnetic force generating section 510 and the second magnetic force generating section 520 are located on a side of the main body 100 away from the eyepiece end. Connecting ends of the first magnetic force generating section 510 and the second magnetic force generating section 520 is located on a side of the main body 100 adjacent to the eyepiece end. The above-mentioned configuration can reduce the space occupied by the magnetic force generating element 500 under a condition of obtaining the same magnetic field strength, thereby reducing the volume and weight of the multifunctional ranging telescope 001.

In some embodiments, as shown in FIG. 1 and FIG. 3, the magnetic force generating element 500, the display device 300, and the wind direction and wind speed sensing device 200 may all be located on the same first sidewall 101 of the main body 100. The magnetic force generating element 500 and the display device 300 are spaced apart to prevent the magnetic force generating element 500 from affecting the display device 300. Such the configuration allows the multifunctional golf range telescope 001 to be placed with a large connection plane, while the display device 300 and the wind direction and wind speed sensing device 200 can be located on the side away from the external space, forming a protective space to a certain extent and increasing the service life.

In some of these embodiments, as shown in FIG. 1, FIG. 2, and FIG. 6, the solar panel 410 may be located on a sidewall adjacent to the first sidewall 101, or on a second sidewall 102 opposite to the first sidewall 101. The solar panel 410 and the magnetic force generating element 500 can be located on different sidewalls, so that the solar panel 410 can continue to work when the magnetic force generating element 500 is connected to the multifunctional ranging telescope 001 and the external ferromagnetic object, thereby improving a utilization rate of the solar panel 410.

In some embodiments, one or more magnetic force generating elements 500 may be provided. When multiple magnetic force generating elements 500 are provided, they may be located on the same sidewall of the main body 100 or on different sidewalls of the main body 100, which can be adjusted according to the actual situation. When mounting the magnetic force generating member 500, the magnetic force generating member 500 may be connected to the main body 100 by connection means such as clamp connection, plug connection or adhesion.

In some embodiments, as shown in FIGS. 1 and 2, the multifunctional ranging telescope 001 further includes a flexible sleeve 700 that covers at least part of the sidewall of the main body 100. In other words, the flexible sleeve 700 can be sleeved on a part of the sidewall of the main body 100 or the entire sidewall of the main body 100. When the flexible sleeve 700 is sleeved on the entire sidewall of the main body 100, as shown in FIG. 2, the flexible cover 700 is provided with an exposing hole 710 for the solar panel 410, the display device 300 and the wind direction and wind speed sensing device 200 to be exposed. The configuration of the flexible cover 700 can improve a shockproof effect of the multifunctional ranging telescope 001 and provide a comfortable grip.

In some of the embodiments, a part of the flexible sleeve 700 is located on a side of the magnetic force generating element 500 away from the main body 100, that is, the flexible sleeve 700 covers the magnetic force generating element 500. Such the configuration can prevent the player from directly touching the magnetic force generating element 500 with a lower temperature when touching the multifunctional ranging telescope 001, which can improve a grip comfort of the multifunctional ranging telescope 001, especially in winter, the player can be willing to use the multifunctional ranging telescope 001.

In some embodiments, the flexible sleeve 700 is provided with a limiting groove (not shown), the sidewall of the main body 100 is provided with a limiting post (not shown). The limiting post is engaged or plugged into the limiting groove, so that the flexible sleeve 700 and the main body 100 are relatively fixed. In other embodiments, the flexible sleeve 700 may be provided with the limiting post, and the sidewall of the main body 100 may be provided with the corresponding limiting groove, which may be configured according to actual conditions.

In some embodiments, referring to FIG. 1, the multifunctional ranging telescope 001 further includes other functional components mounted in the main body 100, such as a speaker 800, a MIC (microphone) assembly 900, a humidity and temperature detection component, a pedometer component, a GPS (global positioning system) component, a wireless communication component, and a voice broadcast component. Additionally, in some embodiments, the multifunctional ranging telescope 001 may include a health sensor provided on the main body 100. The health sensor configured to perform at least one of counting heartbeat, measuring blood pressure, analyzing sweat, measuring body temperature, and detecting ultraviolet intensity. For example, functions such as measuring heartbeat, blood pressure, and analyzing sweat allow a user to know their current physical health status, and then facilitates adjustment of subsequent exercise rhythm. For another example, because golfing is generally a continuous outdoor exercise that lasts for several hours, the function of measuring body temperature can effectively prevent the user from unknowingly suffering from heat stroke due to excessive body temperature during exercise. For another example, by detecting the intensity of ultraviolet rays, users can take effective protection against sunburn according to the intensity of ultraviolet rays. A button is chosen to display a health measurement on the display screen. The above-mentioned health sensor may be located at a place where the main body 100 is held by a hand or other parts of the main body 100 that can be touched by the user's hand. And when a health measurement value exceeds a preset normal range, the main body 100 will give a sound and light reminder through the display device 300 and the speaker 800. The above functional components can be increased or decreased according to an actual need.

It should be noted that the above-mentioned functional components and the core assembly 140 (such as the rangefinder lens 142) of the main body 100 that require the power to work normally can be powered by the power source 400 or other power supplying components. In the illustrated embodiment, the power source 400 can supply power to all the components in the multifunctional ranging telescope 001 that need power.

In addition, in some embodiments, when any of the above functional components and the core assembly 140 of the main body 100 are turned on and off, the switch may be a manual pressing or toggling switch, or a sensing switch, or a Bluetooth or wirelessly controlled switch. A type of the switch can be selected according to the actual situation.

The multifunctional ranging telescope 001 according to the above-mentioned embodiment has the function of measuring the wind direction and wind speed of the hitting point during the process of ranging and telephoto. The wind direction and wind speed information is graphically displayed to the player through the display device 300, so that the player has a more accurate judgment when playing golf. In addition, the multifunctional ranging telescope 001 can be continuously charged through the solar panel 410, which improves a battery life of the multifunctional golf rangefinder telescope 001, reduces a size of the required battery 420, and makes the multifunctional ranging telescope 001 more portable. In addition, the user can be informed of their own health conditions instantly through the configuration of the health sensor, so that the user can adjust their exercise pattern in time, so as to achieve a desired exercise effect or prevent the user from physical discomfort caused by excessive exercise.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

What is claimed is:

1. A multifunctional ranging telescope for golf, comprising:
   a main body;
   a wind direction and wind speed sensing device movably connected to the main body and comprising a sensing element, wherein when the wind direction and wind speed sensing device moves to a sensing position, the sensing element is located outside the main body;
   a display device located on a surface of the main body, wherein the display device is electrically connected to the wind direction and wind speed sensing device and is configured to display a wind direction and wind speed information; and
   a power source configured to supply power to the wind direction and wind speed sensing device and the display device.

2. The multifunctional ranging telescope according to claim 1, wherein the sensing element comprises a plurality of sensors spaced apart in space.

3. The multifunctional ranging telescope according to claim 1, wherein the sensing element comprises a plurality of sensors, and at least two of the sensors are connected to each other in space.

4. The multifunctional ranging telescope according to claim 1, wherein the sensing element comprises a plurality of sensors, and the plurality of sensors are electrically independent from each other.

5. The multifunctional ranging telescope according to claim 1, wherein the sensing element comprises a plurality of sensors, and at least two of the sensors are electrically connected.

6. The multifunctional ranging telescope according to claim 1, wherein the wind direction and wind speed sensing device comprises a movable rod, the sensing element is located at one end of the movable rod, and the other end of the movable rod away from the sensing element is movably connected to the main body.

7. The multifunctional ranging telescope according to claim 6, wherein the movable rod comprises a plurality of rod bodies telescoped with each other to adjust a length of the movable rod.

8. The multifunctional ranging telescope according to claim 6, wherein the main body is provided with an accommodating groove, the other end of the movable rod is rotatably connected to a sidewall or a bottom of the accommodating groove, and when the wind direction and wind speed sensing device is in an initial position, the wind direction and wind speed sensing device is located in the accommodating groove.

9. The multifunctional ranging telescope according to claim 1, further comprising a switch configured to turn on or off the wind direction and wind speed sensing device, and when the wind direction and wind speed sensing device covers or abuts the switch, the switch turns off the wind direction and wind speed sensing device.

10. The multifunctional ranging telescope according to claim 1, wherein the power source comprises a solar panel and a battery, the solar panel is located on the surface of the main body, the battery is located inside the main body, and the solar panel is configured to provide electrical power to the battery.

11. The multifunctional ranging telescope according to claim 1, further comprising a magnetic force generating element connected to a sidewall of the main body and configured to be connected to a ferromagnetic portion.

12. The multifunctional ranging telescope according to claim 1, further comprising a health sensor provided on the main body, wherein the health sensor is configured to perform at least one of counting heartbeat, measuring blood pressure, analyzing sweat, measuring body temperature, and detecting an intensity of ultraviolet rays.

13. The multifunctional ranging telescope according to claim 1, further comprising a flexible sleeve covering a part of the main body, wherein the flexible sleeve is provided with an exposing hole, and the display device and the sensing element are exposed though the exposing hole.

* * * * *